US012181144B2

(12) United States Patent
Jurik et al.

(10) Patent No.: US 12,181,144 B2
(45) Date of Patent: Dec. 31, 2024

(54) REMOVABLE LENS SYSTEM FOR A LUMINAIRE

(71) Applicant: ROBE lighting s.r.o., Roznov pod Radhostem (CZ)

(72) Inventors: Pavel Jurik, Prostredni Becva (CZ); Marek Vaclavek, Valasske Mezirici (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/427,256

(22) Filed: Jan. 30, 2024

(65) Prior Publication Data

US 2024/0167663 A1 May 23, 2024

(51) Int. Cl.
*F21V 5/00* (2018.01)
*F21L 14/00* (2006.01)
(Continued)

(52) U.S. Cl.
CPC .............. *F21V 5/007* (2013.01); *F21L 14/00* (2013.01); *F21V 5/048* (2013.01); *F21V 17/06* (2013.01);
(Continued)

(58) Field of Classification Search
CPC .......... F21V 5/007; F21V 5/048; F21V 21/30; F21V 17/06; F21W 2131/406
See application file for complete search history.

(56) References Cited

U.S. PATENT DOCUMENTS 3,752,561 A 8/1973 Klemt
8,525,999 B2 9/2013 Brukilacchio
(Continued)

FOREIGN PATENT DOCUMENTS

CN 102095086 A 6/2011
CN 102369391 A 3/2012
(Continued)

OTHER PUBLICATIONS

Office Action dated Jul. 7, 2017; U.S. Appl. No. 15/075,191 filed Mar. 20, 2016; 6 pages.
(Continued)

*Primary Examiner* — William N Harris
(74) *Attorney, Agent, or Firm* — Conley Rose, P.C.; Brooks W Taylor

(57) ABSTRACT

A luminaire and optical system are provided. The luminaire includes a head and power circuits configured to provide electrical power to electrical circuits of the head. The head includes an optical system with a light source support plate, a support structure movably coupled to the light source support plate, and a lens support assembly removably coupled to the support structure. The light source support plate includes LED light sources, each configured to emit a light beam. The support structure includes a plurality of apertures, configured to pass the light beam from the LED light sources without modifying the light beam. The lens support assembly includes lenses, each aligned with an optical axis of one of the LED light sources when the lens support assembly is coupled to the support structure. The lens support assembly is removable from the head without removing the support structure from the head.

19 Claims, 5 Drawing Sheets

(51) Int. Cl.

| | |
|---|---|
| ***F21V 5/04*** | (2006.01) |
| ***F21V 17/06*** | (2006.01) |
| ***F21V 21/14*** | (2006.01) |
| ***F21V 21/30*** | (2006.01) |
| ***F21V 23/00*** | (2015.01) |
| ***F21V 29/85*** | (2015.01) |
| ***F21Y 105/14*** | (2016.01) |
| ***F21Y 115/10*** | (2016.01) |
| *F21W 131/406* | (2006.01) |

(52) U.S. Cl.

CPC ............ *F21V 21/145* (2013.01); *F21V 21/30* (2013.01); *F21V 23/008* (2013.01); *F21V 29/85* (2015.01); *F21W 2131/406* (2013.01); *F21Y 2105/14* (2016.08); *F21Y 2115/10* (2016.08)

(56) References Cited

U.S. PATENT DOCUMENTS

| | | | | |
|---|---|---|---|---|
| 9,261,269 | B2 | 2/2016 | Jurik et al. | |
| 9,411,083 | B2 | 8/2016 | Angelini et al. | |
| 9,772,499 | B2 | 9/2017 | Angelini et al. | |
| 10,132,992 | B2 | 11/2018 | Jurik et al. | |
| 10,162,105 | B2 | 12/2018 | Jurik et al. | |
| 10,247,384 | B1 * | 4/2019 | Feinbloom | F21V 17/12 |
| 10,337,692 | B2 | 7/2019 | Jurik et al. | |
| 10,495,802 | B2 | 12/2019 | Jurik et al. | |
| 10,563,839 | B2 | 2/2020 | Jurik et al. | |
| 10,690,842 | B2 | 6/2020 | Jurik et al. | |
| 10,725,221 | B2 | 7/2020 | Jurik et al. | |
| 12,055,283 | B1 * | 8/2024 | Zhang | F21V 17/005 |
| 2001/0007527 | A1 | 7/2001 | Lammers et al. | |
| 2007/0024971 | A1 | 2/2007 | Cassarly et al. | |
| 2008/0013911 | A1 | 1/2008 | Jennings | |
| 2008/0137361 | A1 | 6/2008 | Ho | |
| 2010/0188018 | A1 | 7/2010 | Salm | |
| 2011/0170289 | A1 | 7/2011 | Allen et al. | |
| 2012/0243215 | A1 | 9/2012 | Jurik | |
| 2013/0258667 | A1 * | 10/2013 | Ray | F21K 9/00 362/249.02 |
| 2014/0301071 | A1 | 10/2014 | Jorgensen et al. | |
| 2015/0092418 | A1 | 4/2015 | Jurik et al. | |
| 2015/0103553 | A1 | 4/2015 | Jurik | |
| 2015/0192274 | A1 | 7/2015 | Kubis et al. | |
| 2015/0277035 | A1 | 10/2015 | Bryan et al. | |
| 2015/0362147 | A1 * | 12/2015 | Schouboe | F21V 5/008 362/237 |
| 2016/0018064 | A1 | 1/2016 | Jurik et al. | |
| 2016/0040854 | A1 | 2/2016 | Zhang | |
| 2016/0054646 | A1 | 2/2016 | Chang et al. | |
| 2016/0298813 | A1 | 10/2016 | Jurik et al. | |
| 2017/0351101 | A1 | 12/2017 | Angelini et al. | |
| 2018/0024441 | A1 | 1/2018 | Markle et al. | |
| 2018/0073692 | A1 * | 3/2018 | Jurik | F21V 5/007 |
| 2019/0242549 | A1 | 8/2019 | Jurik et al. | |
| 2019/0339537 | A1 * | 11/2019 | Jiang | F21V 5/007 |

FOREIGN PATENT DOCUMENTS

| | | | |
|---|---|---|---|
| CN | 102859269 | A | 1/2013 |
| CN | 209655126 | U | 11/2019 |
| CN | 212537606 | U | 2/2021 |
| CN | 216521158 | U | 5/2022 |
| DE | 202021101565 | U1 | 6/2022 |
| EP | 2177816 | A2 | 4/2010 |
| EP | 3130843 | A1 | 2/2017 |
| EP | 3783257 | A1 | 2/2021 |
| JP | 2004297058 | A | 10/2004 |
| WO | 2010113100 | A1 | 10/2010 |
| WO | 2013184600 | A1 | 12/2013 |
| WO | 2014031641 | A1 | 2/2014 |
| WO | 2015051034 | A2 | 4/2015 |
| WO | 2015138476 | A2 | 9/2015 |
| WO | 2015138483 | A2 | 9/2015 |

OTHER PUBLICATIONS

Notice of Allowance dated Dec. 1, 2017; U.S. Appl. No. 15/075,191 filed Mar. 20, 2016; 8 pages.

Office Action dated Mar. 29, 2018; U.S. Appl. No. 15/075,191 filed Mar. 20, 2016; 14 pages.

Notice of Allowance dated Jul. 24, 2018; U.S. Appl. No. 15/075,191 filed Mar. 20, 2016; 7 pages.

Office Action dated Oct. 26, 2017; U.S. Appl. No. 15/089,116, filed Apr. 1, 2016; 7 pages.

Notice of Allowance dated May 18, 2018; U.S. Appl. No. 15/089,116 filed Apr. 1, 2016; 12 pages.

Office Action dated Aug. 29, 2019; U.S. Appl. No. 16/144,810, filed Sep. 27, 2018; 14 pages.

Notice of Allowance dated Feb. 24, 2020; U.S. Appl. No. 16/144,810, filed Sep. 27, 2018; 11 pages.

PCT International Search Report; Application No. PCT/US2017/023205; Aug. 1, 2017; 3 pages.

PCT Written Opinion of the International Searching Authority; Application No. PCT/US2017/023205; Aug. 1, 2017; 6 pages.

PCT International Search Report; Application No. PCT/US2017/025658; Aug. 23, 2017; 3 pages.

PCT Written Opinion of the International Searching Authority; Application No. PCT/US2017/025658; Aug. 23, 2017; 5 pages.

Chinese Office Action; Application No. 201780027604.7; Dec. 4, 2019; 16 pages.

European Examination Report; Application No. 17733077.6; Oct. 10, 2019; 6 pages.

Chinese Office Action; Application No. 201780034567.2; Sep. 25, 2019; 12 pages.

Chinese Office Action; Application No. 201780034567.2; Mar. 16, 2020; 12 pages.

European Examination Report; Application No. 17733564.3; Dec. 10, 2019; 5 pages.

Notice of Allowance dated Jul. 15, 2019; U.S. Appl. No. 16/425,554, filed May 29, 2019; 8 pages.

Office Action dated Dec. 10, 2019; U.S. Appl. No. 16/654,951, filed Oct. 16, 2019; 12 pages.

Notice of Allowance dated Mar. 24, 2020; U.S. Appl. No. 16/654,951, filed Oct. 16, 2019; 9 pages.

European Extended Search Report; Application No. 19177453.8; Oct. 4, 2019; 12 pages.

European Extended Search Report; Application No. 24167798.8; Oct. 16, 2024; 13 pages.

* cited by examiner

REMOVABLE LENS SYSTEM FOR A LUMINAIRE

TECHNICAL FIELD OF THE DISCLOSURE

The disclosure generally relates to luminaires, and more specifically to a system for a removable lens in a stage luminaire.

BACKGROUND

Luminaires with automated and remotely controllable functionality (referred to as automated luminaires) are well known in the entertainment and architectural lighting markets. Such products are commonly used in theatres, television studios, concerts, theme parks, night clubs, and other venues. A typical automated luminaire provides control, from a remote location, of the output intensity, color and other functions of the luminaire allowing an operator to control such functions for many luminaires simultaneously. Many automated luminaires additionally or alternatively provide control from the remote location of other parameters such as position, focus, zoom, beam size, beam shape, and/or beam pattern of light beam(s) emitted from the luminaire.

BRIEF DESCRIPTION OF THE DRAWINGS

For a more complete understanding of this disclosure, reference is now made to the following brief description, taken in conjunction with the accompanying drawings in which like reference numerals indicate like features.

SUMMARY

Figure 1:
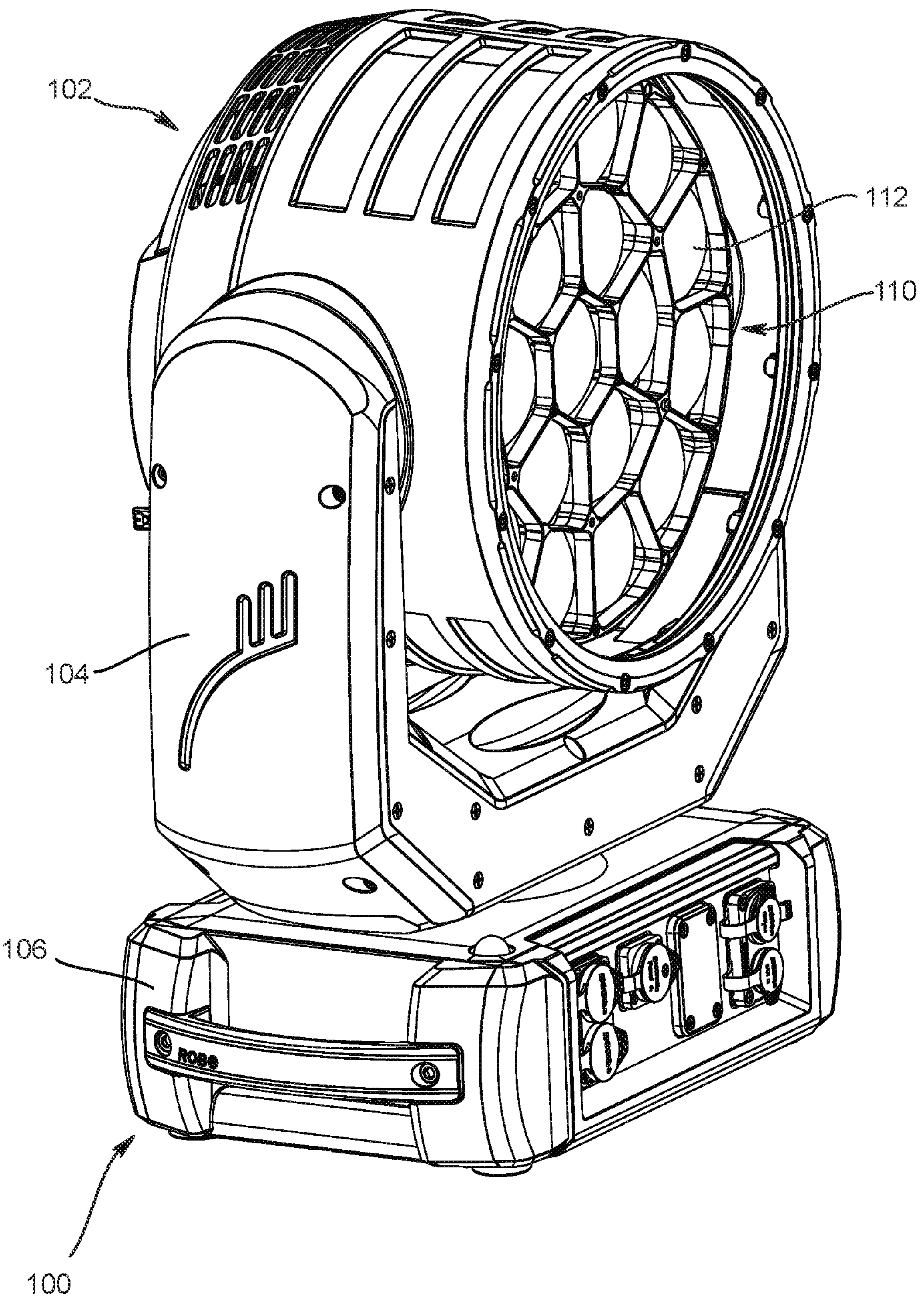
FIG. 1 presents a view of a luminaire according to the disclosure.

In a first embodiment, an optical system includes a light source support plate, a support structure movably coupled to the light source support plate, and a lens support assembly removably coupled to the support structure. The light source support plate includes a plurality of LED light sources, where each light source is configured to emit a light beam. The support structure includes a plurality of apertures, where each aperture is configured to pass the light beam from a corresponding one of the LED light sources without modifying the light beam. The lens support assembly includes a plurality of lenses and is removable from the support structure without removing the support structure from the light source support plate. Each lens is aligned with an optical axis of a corresponding one of the LED light sources when the lens support assembly is coupled to the support structure.

In a second embodiment, a luminaire includes a head and power circuits configured to provide electrical power to electrical circuits of the head. The head includes a light source support plate, a support structure movably coupled to the light source support plate, and a lens support assembly removably coupled to the support structure. The light source support plate includes a plurality of LED light sources, where each light source is configured to emit a light beam. The support structure includes a plurality of apertures, where each aperture is configured to pass the light beam from a corresponding one of the LED light sources without modifying the light beam. The lens support assembly includes a plurality of lenses where each lens is aligned with an optical axis of a corresponding one of the LED light sources when the lens support assembly is coupled to the support structure. The lens support assembly is removable from the head without removing the support structure from the head.

DETAILED DESCRIPTION

Preferred embodiments are illustrated in the figures, like numerals being used to refer to like and corresponding parts of the various drawings.

Some luminaires according to the disclosure have lens systems that include an array of multiple small lenses. Such luminaires may be used as a variable angle beam or wash lights and may use multiple colors of light emitters under control from a remotely positioned lighting desk, thus allowing an operator to control the color and intensity of the emitted light. Users of such luminaires may desire to clean the array of lenses to remove accumulated dirt, as well as residue from theatrical fog or haze or other sources. Such cleaning may be complicated by mechanisms that move the lenses to change beam angle.

Arrays of multiple small lenses may be used in luminaires having multiple light emitting diodes (LEDs) as light sources, more so than in luminaires that utilize incandescent or discharge lamps. Individual LEDs are small, but not as bright as the prior art light sources, so using them in arrays where each LED cluster has its own optical system is advantageous. A consequence of this is that such luminaires include one or more structures to support and move the array of multiple lenses relative to the LEDs. In some luminaires, such support and movement structures may complicate user access for cleaning and maintenance of the array of lenses.

Productions in which such luminaires are used may also operate theatrical fog or haze machines to provide atmosphere and emphasize lighting effects. Such theatrical fog—as well as dust and other materials in the atmosphere—can condense on surfaces such as the lenses in luminaires, diminishing light output and beam quality. Such depositions on lens arrays may be cleaned off to restore the output of the luminaire. Additionally, cleaning such depositions from a lens support assembly that holds the lenses may improve the external appearance of the luminaire.

The present disclosure describes a removable lens support assembly that enables lenses to be removed for cleaning and maintenance with reduced disassembly of the luminaire. In addition, the materials used in the manufacture of the lens support assembly also simplify cleaning by allowing the lenses and the lens support assembly to be cleaned together in a single process. Furthermore, the lens support assembly simplifies maintenance of the lenses by allowing removal from the luminaire and transport to a workspace of only the lens support assembly, rather than the entire luminaire Once at the workspace, a technician has a simpler task of disassembling only the lens support assembly to enable replacement of damaged lenses. This is in contrast to the more extensive disassembly of the luminaire in order to extract the damaged lenses as required by other luminaire designs.

FIG. 1 presents a view of a luminaire 100 according to the disclosure. The luminaire 100 comprises a head 102 which, in turn, includes an array of lenses 112 through which pass light beams emitted by corresponding light emitters. The lenses 112 are mounted in a lens assembly 110. In the example shown, the lens assembly 110 includes nineteen lenses, however other numbers of lenses may be used in other embodiments. The head 102 is mounted in a yoke assembly 104 that, in turn, is mounted on a base 106. The yoke assembly 104 is rotatably mounted on the base 106 to provide rotation about a pan axis and the head 102 is rotatably mounted in the yoke assembly 104 to provide rotation about a tilt axis. The base 106 includes power circuits configured to provide electrical power to electrical circuits of one or more of the base 106, the yoke assembly 104, and the head 102.

Figure 2:
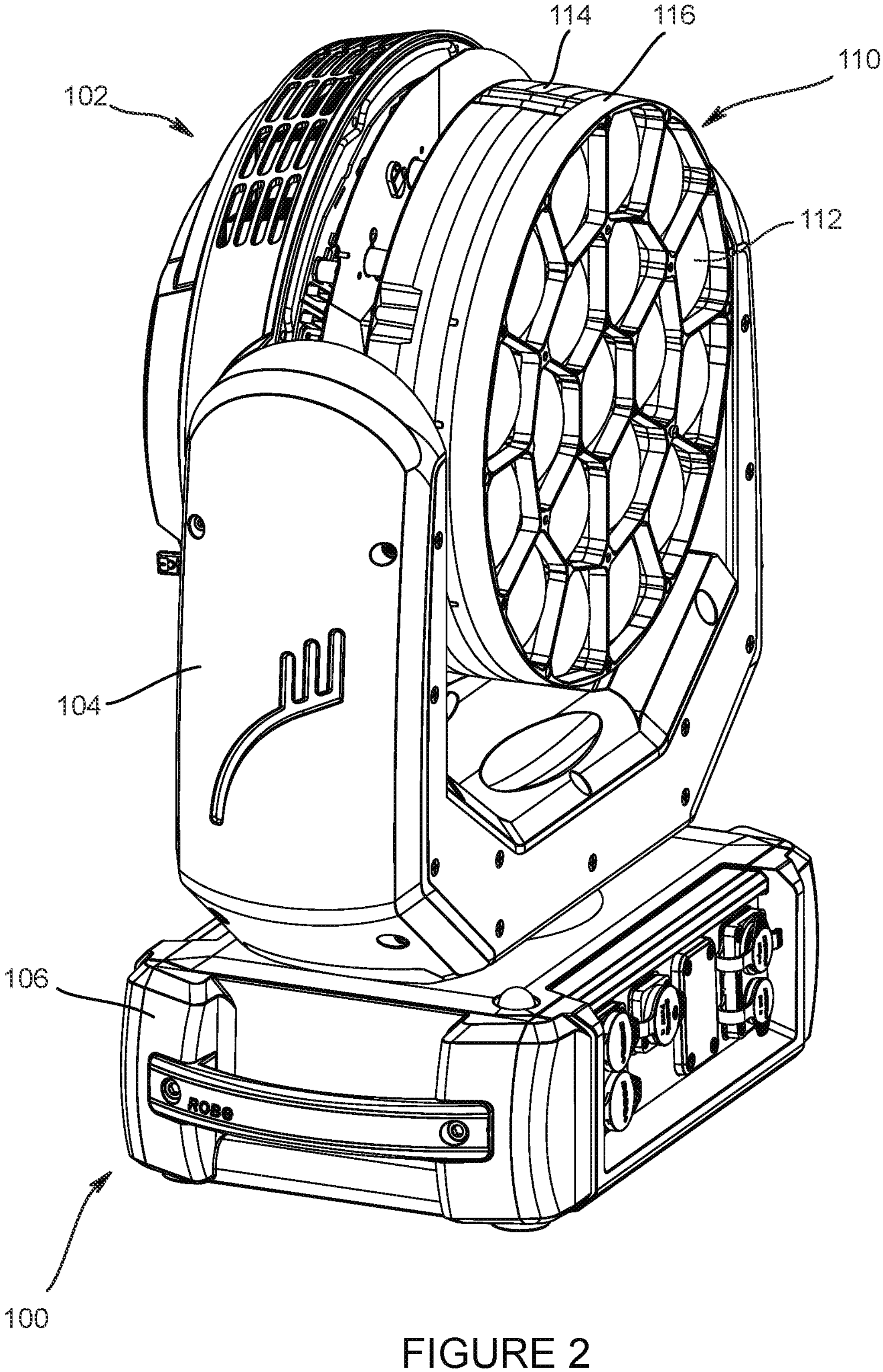
FIG. 2 presents a view of the luminaire of FIG. 1 with some external covers removed.

FIG. 2 presents a view of the luminaire 100 of FIG. 1 with some external covers removed. The lens assembly 110 comprises a support structure 114 and a lens support assembly 116. The lenses 112 are mounted in the lens support assembly 116.

Figure 3:
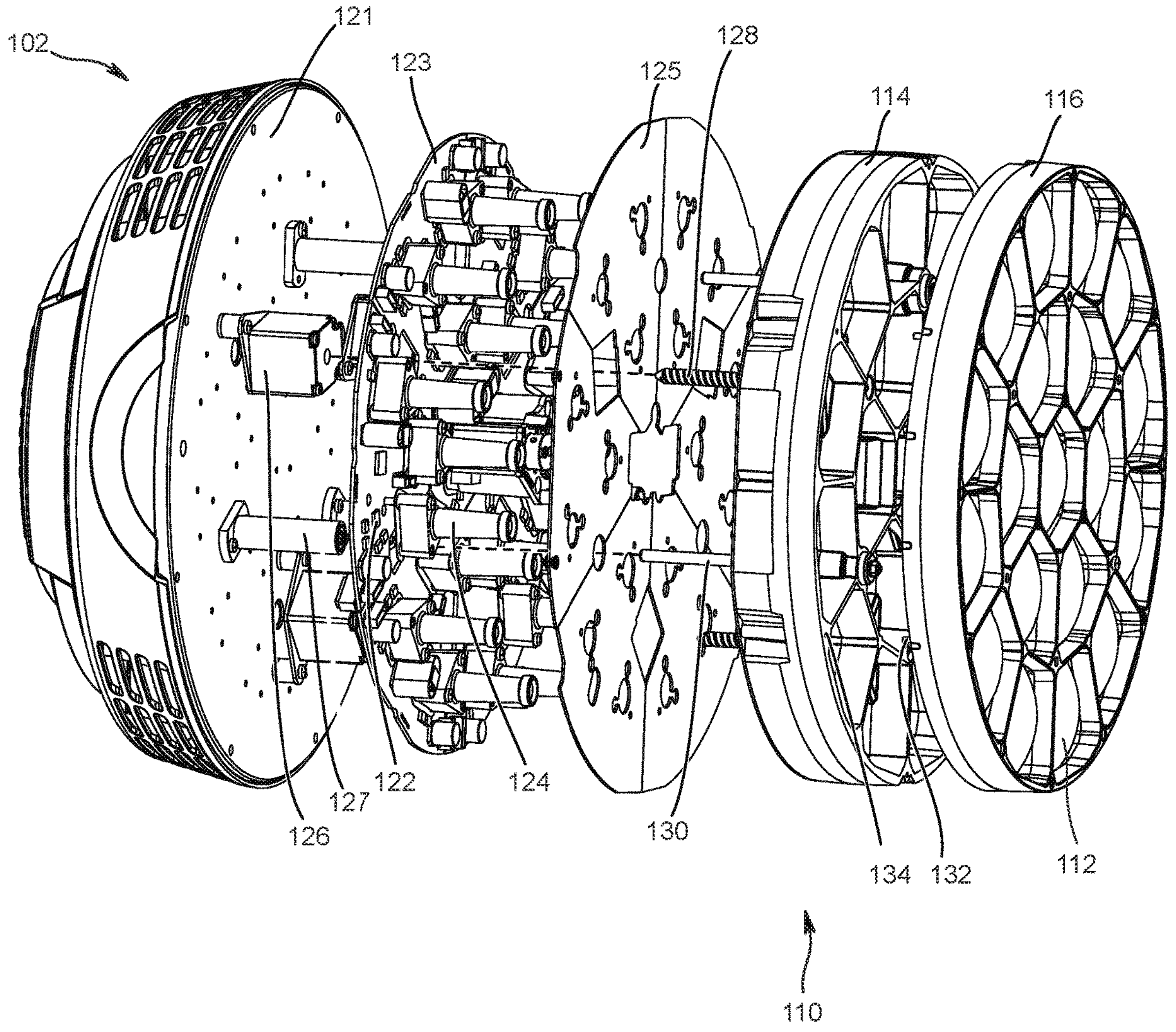
FIG. 3 presents a front oblique exploded view of the head of the luminaire of FIG. 2.

FIG. 3 presents a front oblique exploded view of the head 102 of the luminaire 100 of FIG. 2. The lens support assembly 116 is shown as separated from the support structure 114. The luminaire head 102 includes LED light sources 122, mounted on a light source support plate (or PCB) 123. Each LED light source 122 has an associated homogenizing optical system 124. The LED light sources 122 and the triangular bottom portions of their homogenizing optical systems 124 are covered by a light shield 125 that reduces light emitting from the LED light sources 122 and the triangular bottom portions of the homogenizing optical systems 124 from spilling onto and through the lenses of the lens support assembly 116. The head 102 is shown in FIG. 3 with external covers removed only for clarity of illustration. In some embodiments, the lens support assembly 116 may be uncoupled from the support structure 114 without removal of the external covers.

The LED light sources 122 may comprise one or more LED emitters in the same or multiple colors. In some embodiments, the LED emitters may be red, green, blue, and white. Any other mix of colors or white LED emitters may be used in other embodiments. Such embodiments may include red, green, blue, or amber LED emitters, warm white or cold white LED emitters, or a tunable mix of white LED emitters. The homogenizing optical systems 124 may comprise light pipes, lenses, diffusing material, or other optical components suitable for homogenizing light from the associated LED light sources 122.

Each LED light source 122 and its associated homogenizing optical system 124 emits a light beam that passes through a corresponding aperture of the support structure 114. The light beam is not modified by the aperture of the support structure 114. Each light beam then passes through a corresponding one of the lenses 112, the corresponding lens 112 aligned with an optical axis of the LED light source 122 emitting the light beam.

To alter a beam angle of the light output of the luminaire 100, the lens assembly 110 is moved toward and away from the luminaire head 102, thereby moving the lenses 112 along their optical axes toward and away from the LED light sources 122 and the homogenizing optical systems 124. In the embodiment shown, this movement is caused by stepper motors 126 and associated lead screws 128. The stepper motors 126 are attached to a motor support plate 121. Each stepper motor 126 is coupled at its output shaft to the associated lead screw 128. The lead screws 128 engage with corresponding travel nuts that are fixedly mounted to the support structure 114. As the stepper motors 126 and the lead screws 128 rotate, the support structure 114 is moved toward and away from the light source support plate 123 along linear support rods 130. As such, the support structure 114 is moveably coupled to the light source support plate 123. The linear support rods 130 are fixedly attached to the support structure 114 and slide within corresponding bearing sleeves 127, which are fixedly mounted to the motor support plate 121.

The lead screws 128 and the linear support rods 130 operate to maintain alignment of the apertures of the support structure 114, as well as the lenses 112, with their corresponding LED light sources 122. In other embodiments, other mechanical systems may be used to move the lens assembly 110 toward and away from the luminaire head 102 while maintaining alignment of the apertures of the support structure 114, as well as the lenses 112, with their corresponding LED light sources 122.

In some embodiments, the motor support plate 121 is a metal plate comprising aluminum or copper (or a similar material with high heat transmissivity). In such embodiments, the PCB 123 is mounted on the motor support plate 121, enabling heat from the light sources 122 and the PCB 123 to transfer to the heatsinks attached to a rear side of the motor support plate 121.

The lens support assembly 116 is removably coupled to the support structure 114 by one or more releasable fasteners 132. In the embodiment shown in FIG. 3, the releasable fasteners 132 are screws which pass through the lens support assembly 116 and engage with corresponding threaded holes 134 in the support structure 114. In some embodiments, nuts or captive nuts may be used instead of the threaded holes 134. In other embodiments, the releasable fasteners 132 may comprise other types of releasable fasteners, e.g., captive screws. In still other embodiments, the releasable fasteners 132 may comprise fasteners that do not require a tool to unfasten (quick release fasteners), e.g., clips, slide latches, or quarter turn fasteners.

The user undoes the one or more releasable fasteners 132 that couple the lens support assembly 116 to the support structure 114 in order to remove only the lens support assembly 116 for cleaning of the lenses 112. The complete lens support assembly 116, including the lenses 112, may then be cleaned—with access to both sides of lenses 112—without the need for further disassembly of the luminaire head 102 or the lens support assembly 116. Disassembly of the support structure 114, the lead screws 128, the linear support rods 130, and/or the homogenizing optical systems 124 is not required for cleaning the lens support assembly 116 and the lenses 112.

Figure 4:
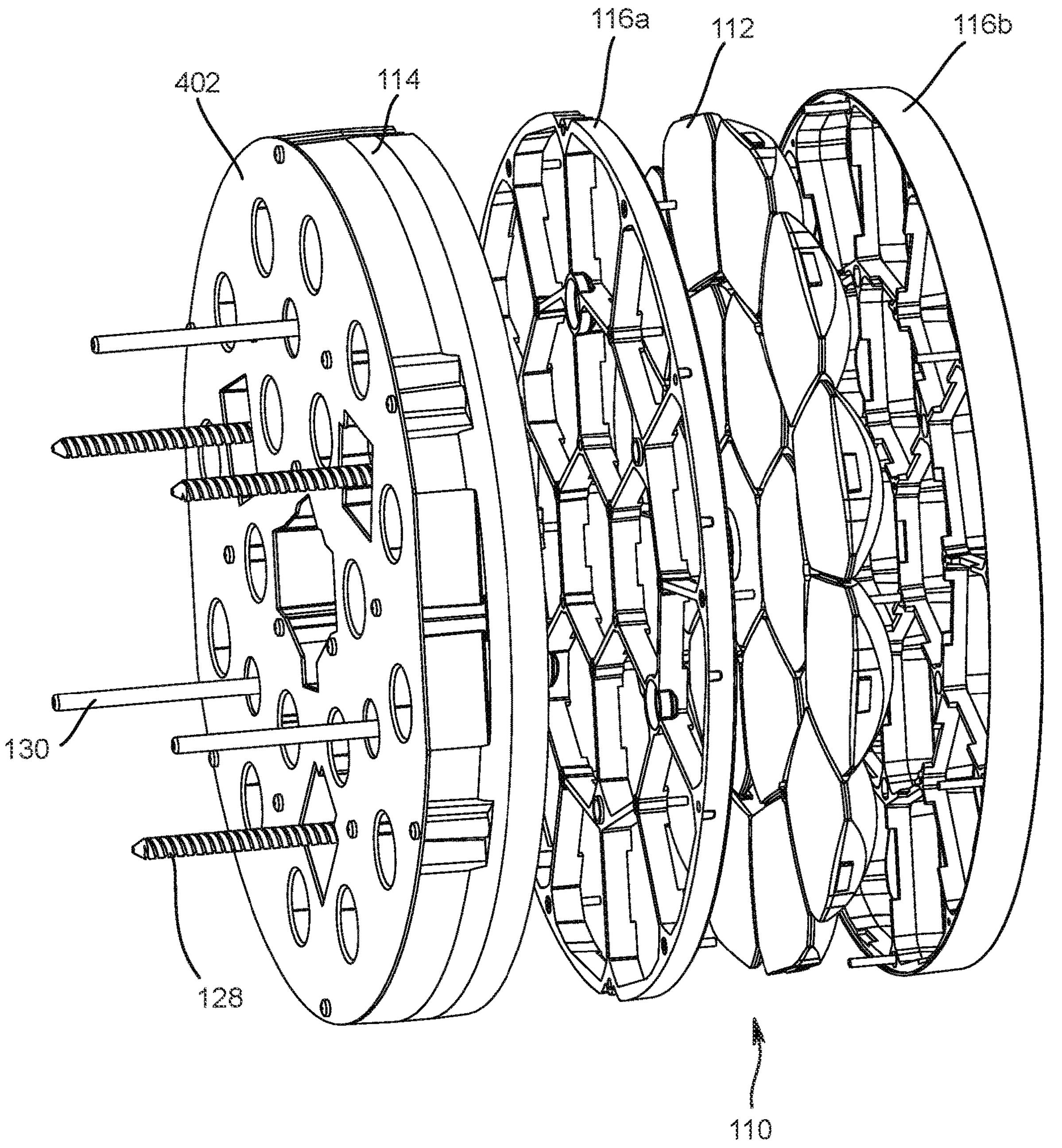
FIG. 4 presents a rear oblique exploded view of a lens support assembly according to the disclosure.

FIG. 4 presents a rear oblique exploded view of the lens support assembly 116 according to the disclosure. The support structure 114 is shown separate from the head 102 only for context. In use, when the lens support assembly 116 is removed from the head 102 and the luminaire 100, the support structure 114 remains in the head 102, with the lead screws 128 coupled to their associated stepper motors 126 and the linear support rods 130 engaged with their corresponding bearing sleeves 127. The support structure 114 includes a light shield 402 that comprises individual circular orifices through which the homogenizing optical systems 124 extend.

The walls of the ribs of the support structure 114 form apertures in the support structure 114. Each homogenizing optical system 124 emits a light beam from its associated LED light source 122. Each light beam passes through a corresponding aperture of the support structure 114. Each light beam then passes through a corresponding one of the lenses 112, the corresponding lens 112 aligned with an optical axis of the LED light source 122 emitting the light beam. The light beams emitted from the homogenizing optical system 124 are not modified by the apertures of the support structure 114. However, the circular orifices of the light shield 402 and the walls of the ribs of the support structure 114 reduce other light within the head 102 from spilling onto and through the lenses of the lens support assembly 116.

The lens support assembly 116 is shown in FIG. 4 exploded into a rear plate 116*a* and a front plate 116*b* (also referred to as support section plates), between which are clamped the individual lenses 112. The rear plate 116*a* and the front plate 116*b* are configured to clamp the individual lenses 112 at their edges, to reduce or avoid modification of the light beams passing through the individual lenses 112, as well as to prevent light spilling from one lens 112 to another lens 112.

The rear plate 116*a* and the front plate 116*b* of the lens support assembly 116 are shown separated in FIG. 4 only for clarity of explanation. The lens support assembly 116 may remain assembled for cleaning, but may be disassembled for cleaning and/or replacement of individual lenses. As such, the front plate 116*b* is removably coupled to the rear plate 116*a*. Similar to coupling the lens support assembly 116 to the support structure 114, the rear plate 116*a* and the front plate 116*b* may be coupled by screws or other suitable fasteners, such as screws 136, visible in FIG. 5.

The support section plates 116*a* and 116*b* are constructed of materials that are selected to allow the entire lens support assembly 116, including the lenses 112, to be cleaned in a single process, using the same cleaning materials used to clean the individual lenses 112. One such process is manual cleaning with a cloth plus a cleaning fluid of some kind. The fluid could be water, water plus detergent, isopropyl alcohol, or a commercial lens cleaning fluid. Another such process is cleaning in a dishwasher with detergent. In some embodiments, a commercial dishwasher may be used to clean the lenses at a higher temperature and/or in less time than in a residential dishwasher. Such a process may be used where lens support assemblies 116 from a large number of luminaires are to be cleaned at the same time.

The support section plates 116*a* and 116*b* may comprise a metal (e.g., magnesium alloy, aluminum or an aluminum alloy, or other suitable metal) or a plastic material with a heat deflection temperature of at least 125° Celsius, to avoid shape deformation during the washing process (e.g., Nylon 6, Polycarbonate, or a polymer filled or reinforced with a glass fiber). In further embodiments, one of the support section plates 116*a* and 116*b* may comprise a metal and the other comprise a plastic material. Such a combination of materials may reduce cracking of the lenses 112 caused by differential heat expansion of the support section plates 116*a* and 116*b*.

Figure 5:
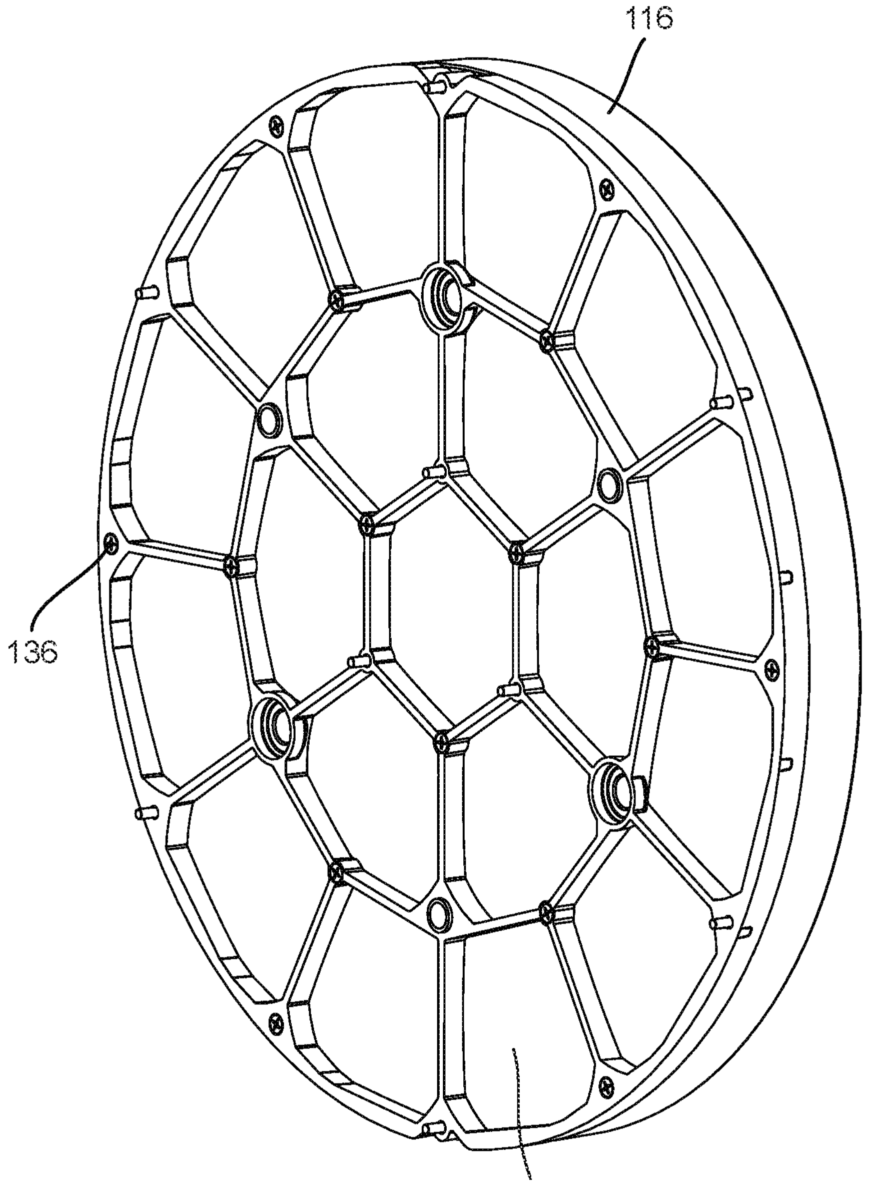
FIG. 5 presents a rear view of the lens support assembly according to the disclosure.

FIG. 5 presents a rear view of the lens support assembly 116 according to the disclosure. It may be seen in FIG. 5 that the rear surfaces of the lenses 112 are available for cleaning.

Some luminaires permit cleaning only the front surfaces of lenses and require the disassembly of multiple components of the luminaire head to access the back side of the lenses. In order to remove the lenses from such luminaires, steps such as removing luminaire head covers, unscrewing leadscrew nuts from their associated leadscrews, and pulling the linear support rods from their bearing sleeves may be required. The back side of the lenses can then be accessed, but the linear support rods remain extending from the back side of such a lens assembly and have lubrication on their surfaces. Cleaning the lenses or disassembly of the lens assembly to remove individual lenses for replacement may require removal of the linear support rods and/or their relubrication after replacement. When the lens assembly is returned to the luminaire, all linear support rods must be simultaneously reseated in their bearing sleeves, the leadscrew nuts reattached and adjusted to ensure the lens assembly is parallel to the plane of the luminaire light sources, and the luminaire head covers reattached.

A luminaire according to the disclosure solves such problems by requiring only the removal of the lens support assembly 116 from the luminaire 100 to clean both sides of the lenses and/or to replace lenses. No other components of the head 102 remain attached to the lens support assembly 116 to interfere with such activities. The support structure 114 remains in the luminaire 100 and thus, the travel nuts remain attached to the lead screws 128 and the linear support rods 130 remain seated in the bearing sleeves 127. Furthermore, the lens support assembly 116 is configured to be cleaned in the same process used to clean the lenses 112. Additionally, for individual lens replacement, the lens support assembly 116 may easily be removed and taken to a workbench for disassembly and replacement of one or more lenses.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. An optical system comprising:

a light source support plate comprising a plurality of LED light sources, wherein each light source is configured to emit a light beam;

a support structure, movably coupled to the light source support plate, wherein the support structure comprises a plurality of apertures, each aperture configured to pass the light beam from a corresponding one of the LED light sources without modifying the light beam; and a lens support assembly, removably coupled to the support structure, wherein:

the lens support assembly comprises a plurality of lenses, each lens aligned with an optical axis of a corresponding one of the LED light sources when the lens support assembly is coupled to the support structure, the lens support assembly comprises a front plate removably coupled to a rear plate, the front plate and the rear plate configured, when coupled together, to clamp the lenses of the plurality of lenses into position, and the lens support assembly is removable from the support structure without removing the support structure from the light source support plate.

2. The optical system of claim 1, wherein the lens support assembly is removably coupled to the support structure by a quick release fastener.

3. The optical system of claim 1, wherein the front plate is removably coupled to the rear plate by a quick release fastener.

4. The optical system of claim 1, wherein the front plate and the rear plate comprise materials selected to allow the front plate, the rear plate, and the plurality of lenses to be cleaned in a single process.

5. The optical system of claim 4, wherein the lens support assembly is configured to be cleaned in a commercial dishwasher.

6. The optical system of claim 4, wherein one of the front plate and the rear plate comprises a metal and another one of the front plate and the rear plate comprises a plastic.

7. The optical system of claim 4, wherein the front plate and the rear plate each comprises a material having a heat deflection temperature of at least 125° Celsius.

8. The optical system of claim 4, wherein the lens support assembly is removably coupled to the support structure by a quick release fastener.

9. A luminaire comprising:

a head comprising:

a light source support plate comprising a plurality of LED light sources, wherein each light source is configured to emit a light beam;

a support structure, movably coupled to the light source support plate, wherein the support structure comprises a plurality of apertures, each aperture configured to pass the light beam from a corresponding one of the LED light sources without modifying the light beam; and a lens support assembly, removably coupled to the support structure, wherein:

the lens support assembly comprises a plurality of lenses, each lens aligned with an optical axis of a corresponding one of the LED light sources when the lens support assembly is coupled to the support structure, the lens support assembly comprises a front plate removably coupled to a rear plate, the front plate and the rear plate configured, when coupled together, to clamp the lenses of the plurality of lenses into position, and the lens support assembly is removable from the head without removing the support structure from the head; and power circuits configured to provide electrical power to electrical circuits of the head.

10. The luminaire of claim 9, further comprising:

a yoke assembly, wherein the head is rotatably mounted in the yoke assembly for rotation about a tilt axis.

11. The luminaire of claim 10, further comprising:

a base, wherein the yoke assembly is rotatably mounted to the base for rotation about a pan axis.

12. The luminaire of claim 9, wherein the lens support assembly is configured to be removed from the head without removing an external cover of the head.

13. The luminaire of claim 9, wherein the lens support assembly is removably coupled to the support structure by a releasable fastener.

14. The luminaire of claim 13, wherein the releasable fastener comprises a quick release fastener.

15. The luminaire of claim 13, wherein the releasable fastener comprises a screw.

16. The luminaire of claim 9, wherein the front plate and the rear plate comprise materials selected to allow the front plate, the rear plate, and the plurality of lenses to be cleaned in a single process.

17. The luminaire of claim 16, wherein the lens support assembly is configured to be cleaned in a commercial dishwasher.

18. The luminaire of claim 16, wherein one of the front plate and the rear plate comprises a metal and another one of the front plate and the rear plate comprises a plastic.

19. The luminaire of claim 16, wherein the front plate and the rear plate each comprises a material having a heat deflection temperature of at least 125° Celsius.

* * * * *